United States Patent [19]

Brown

[11] Patent Number: 4,785,632

[45] Date of Patent: Nov. 22, 1988

[54] SOLAR ENERGY CONCENTRATOR

[76] Inventor: Howard D. Brown, Rte. 9, Box 190A, Hagerstown, Md. 21740

[21] Appl. No.: 702,508

[22] Filed: Feb. 19, 1985

Related U.S. Application Data

[63] Continuation of Ser. No. 548,030, Nov. 2, 1983, abandoned, which is a continuation of Ser. No. 366,998, Apr. 9, 1982, abandoned, which is a continuation of Ser. No. 20,453, Mar. 14, 1979, abandoned, which is a continuation of Ser. No. 803,864, Jun. 6, 1977, abandoned.

[51] Int. Cl.⁴ .............................. F03G 7/02
[52] U.S. Cl. .................. 60/641.15; 126/425; 126/438
[58] Field of Search .............. 60/641.8, 641.15; 126/424, 425, 438

[56] References Cited

U.S. PATENT DOCUMENTS

| | | | |
|---|---|---|---|
| 3,643,648 | 2/1972 | Tarcici | 126/270 |
| 3,892,433 | 7/1975 | Blake | 290/52 |
| 4,015,585 | 4/1977 | Fattor | 126/271 |
| 4,102,326 | 7/1978 | Sommer | 126/270 |
| 4,111,184 | 9/1978 | Perkins | 60/641.15 X |

Primary Examiner—Allen M. Ostrager

[57] ABSTRACT

Continuous concentration of solar heat on a fluid contained in a fixed, spherical boiler chamber, whereby the fluid is vaporized and thus drives a turbine, is effected by means of a paraboloidal reflector to which solar countermotion about the boiler center point is externally imparted by a carriage. Mounted on a base of variable configuration, the upper surface of which lies in a polar plane, a single configuration of reflector and carriage will operate throughout the time from sunrise to sunset on every day of the year, without structural change, at any suitable site in the torrid and temperate zones of the earth, regardless of the lattitude of the site. The turbine and boiler chamber are supported by cantilever members of an independent power plant structure. Reflector efficiency is maximized by the absence of shadow, brought about by the omission of that part of a conventional, fully circular paraboloid which would traverse the shadows of said turbine and of said cantilever members. Heat loss is minimized, thereby maximizing thermal efficiency, by location of the turbine above and in close proximity to the boiler chamber, said location being facilitated without shadow by the reflector shape and orientation.

4 Claims, 1 Drawing Sheet

U.S. Patent    Nov. 22, 1988    4,785,632
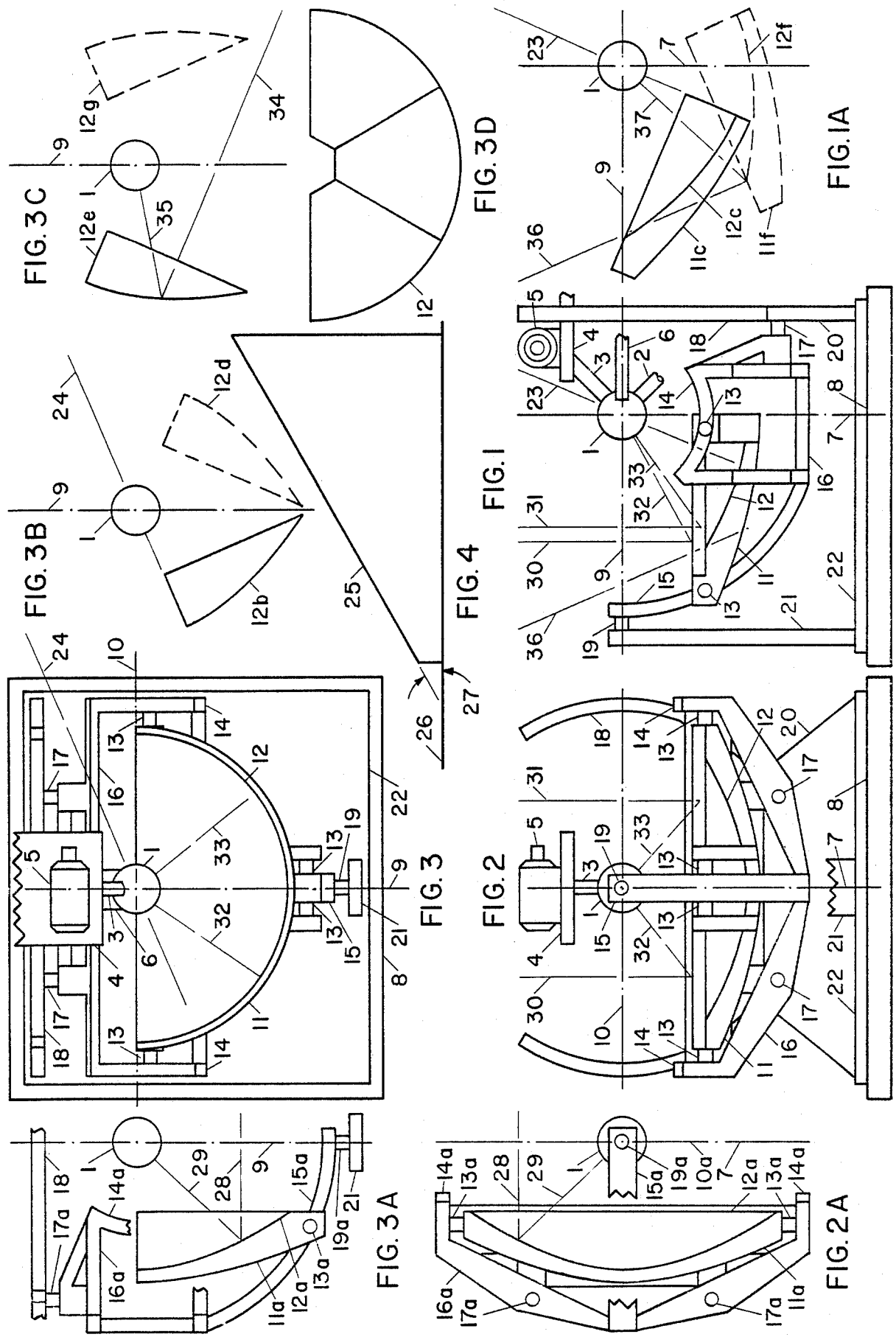

SOLAR ENERGY CONCENTRATOR

This application is a continuation of Ser. No. 06/548,030, filed Nov. 2, 1983, and now abandoned; which application was a continuation of Ser. No. 06/366,998, filed Apr. 9, 1982 and now abandoned; which application was a continuation of Ser. No. 06/20,453, filed Mar. 14, 1979 and now abandoned; which application was a continuation of Ser. No. 05,803,864, filed June 6, 1977 and now abandoned.

BACKGROUND OF THE INVENTION

Problem No. 1 in the practical utilization of solar energy is that the sun sets every evening, while the energy requirements of mankind continue round the clock. As a solution to this problem I offer a solar powered gas generation process, covered by U.S. Pat. No. 4,080,271, wherein solar power is utilized to generate an electrical potential, which in turn is applied to the electrolytic separation of hydrogen from sea water. Hydrogen is the ecologically perfect fuel, or it can be utilized in the manufacture of propane, which is, everything considered, the practically preferable fuel. Propane, the fuel of the future, can be utilized round the clock in every application in which fuel is consumed.

Problem No. 2 is that the solar heat coming to the earth is too much attenuated to be of practical utility in the generation of power. It must be concentrated in order to become utile.

Problem No. 3, the present one, has many parameters, including that:

due to the daily, west-to-east rotation of the earth about its polar axis, the sun apparently travels across the sky from sunrise in the east to sunset in the west, traversing an arc of 180° from horizon to horizon;

the polar axis of the earth is tipped from the vertical with respect to the plane of the orbit at an angle of about 23°30′, pointing continuously to Polaris, the North Star, and for this reason, as the earth revolves about the sun in its annual, nearly circular orbit, the sun also apparently travels up and down the sky in an annual cycle, through an arc of about 47° north and south, the midpoints of this travel being the equinoxes, the extremes being the summer and winter solstices, the total cycle encompassing an arc of about 94°, and the average daily increment of this travel being about one quarter of a degree;

at the equator on the day of an equinox the sun rises nearly due east, stands at the zenith at noon and sets nearly due west; at other latitudes on this day the sunrise and sunset headings are respectively the same as they are at the equator, but the meridian declination of the sun is south of the local zenith at north latitudes and north of the local zenith at south latitudes, the angle of declination in each case being equal to the latitude, and the variation in declination, from one latitude to another, being a function of the curvature of the earth;

on the day of the summer solstice the sun rises a very small fraction of a degree less than 23°30′ north of east, has a meridian declination 23°30′ north of the equatorial zenith (assuming this to be the precise figure) and sets a very small fraction less than 23°30′ north of west, the angle being very nearly the same all day;

the sunrise-to-sunset motion is repetitive, with a nocturnal return swing; the seasonal motion is oscillatory in an annual cycle, with small, progressive (except at the solstices, which are turn-around points) increments during each day and from one day to the next;

a reflector, to follow the sun, must have a compound motion about a point, the point being on or geometrically within a heat receiver, and the motion being counter to the vectorial sum of the solar motions above described;

the intensity of light is known to vary inversely as the square of the distance from source to object; the intensity of heat is said to vary inversely as the cube of the distance from source to object, although I have seen no scientific proof of this; but in either case an inverse ratio applies to the effect of distance from reflector to heat receiver;

a moving reflector having a paraboloidal shape and contour is well known to the prior art (and very well known, in the opposite application, in millions of automobile headlights); due to the minimum effect of the inverse factor of distance the reflecting efficiency of this element is high, and the size and therefore the capacity of this element is limited only by the problem of bracing the structure against wind force;

a plurality of plane mirrors, all moving to reflect sunbeams to a fixed heat receiver, is also known; the reflecting efficiency of this combination is lower than that of the above element, but, while the size of such an array is limited by the law of diminishing returns as it relates to the inverse factor of distance, the total reflecting area of the mirrors can be many times larger than that of the moving, paraboloidal reflector;

the combination of a large array of moving, plane mirrors and a fixed, paraboloidal reflector, focused on a fixed heat receiver, is also known; while this combination is the most adversely affected by the inverse factor of distance, involving as it does two distances traveled by the reflected beams, it is still capable of producing the highest temperatures at the focal point, as witness the magnificent solar furnace at Odeillo, France, the acme of the prior art;

a single configuration of a paraboloidal reflector and a motion-imparting mechanism—herein called a carriage—moving about a fixed, vertical axis and about a second axis which rotates in a horizontal plane, the two axes intersecting within a fixed heat receiver, can follow the sun at any latitude, but the motion, intended to include compensation for the latitude vector in meridian declinations, comprises redundant increments which render it inefficient;

a single configuration of paraboloidal reflector and carriage having reflector motion about a fixed axis parallel to the polar axis of the earth and about a second axis which rotates in a plane parallel to the equatorial plane of the earth can follow the sun in true solar countermotion, which is 100% efficient, at any latitude, provided that the carriage be mounted on a base having an upper surface which is parallel to the polar axis, the base being static but varying in configuration from one latitude to another;

a heat receiver which comprises a spherical boiler chamber containing a circulating, volatile fluid and is operatively connected to a heat engine is known to the prior art; it has been generally accepted practice to support both of these elements in fixed positions, as they are essentially power plant elements;

a heat receiver lacking the cooling effect of the circulating medium is not recommended, due to the intense concentration of heat at the focal point of the paraboloidal reflector;

the area efficiency of a reflector is diminished by shadow, a fact which has been neglected in the prior art, as the writer learned in the course of a comprehensive patent search;

in the known structure which operates on vertical and horizontal axes the extent of a shadow which passes across the moving reflector varies from one latitude to another;

in the new structure which operates on polar and equatorial axes the extent of shadow across the moving reflector is the same at all latitudes, so that the shaded area can be minimized by the arrangement of stationary elements of the structure, and the reflector area which is unavoidably shaded can be omitted, leaving a portion of a paraboloid which has an area efficiency of 100%;

an example of the combination of moving, plane mirrors and a fixed chamber containing a volatile fluid, recently built in southern California, is arranged with the chamber high in the air and an operatively connected heat engine at ground level, an arrangement which is the same as—or worse than—that of the notoriously inefficient steam locomotive, wherein the boiler was above the cylinders;

a combination comprising a moving, fully circular paraboloid and a fixed boiler chamber, in addition to having the shadow problem associated with chamber supporting structure, presents a problem of heat loss in transmission of the heated fluid from the chamber past the rim of the reflector; and the combination herein set forth, comprising the fixed boiler chamber, the moving, partial paraboloid and the polar plane base, can utilize simple cantilever members of an independent power plant structure to support both the chamber and a heat engine, and, by the simple and well-known principle that heat rises, the engine can be positioned above the chamber to accomplish the upward transmission of heated fluid with a thermal efficiency which is as good as can be expected in the overall combination.

The present concept achieves 100% area efficiency of the reflector, maximum efficiency in reflection, 100% efficiency of reflector motion and maximum thermal efficiency in the heat transfer cycle, at any suitable site in the torrid and temperate zones of the earth. The reflecting efficiency of the paraboloid, associated with the effect of the inverse factor of distance, must be presumed to be known to the prior art, but the other features are novel, and it is stressed that in a solar energy concentrating device operational efficiency is paramount.

The combination of reflector and carriage can be mass produced to a single design, thus enjoying the maximum of cost efficiency in manufacture, and since the reflecting surface will be the most expensive item to produce and to maintain, it will contribute to the cost efficiency if the area of said surface which is not fully effective is omitted.

The polar plane base, which in any case will be built on site, can be tailored to the latitude of each site, using adjustable forms for poured concrete.

A large plurality of moderately sized solar energy concentrators, each one having a partial-paraboloidal reflector on the order of 36' in diameter, and connected in groups of ten or so, each group connected to an electrolytic cell, can be installed in each of the desert areas of the world. The sources of both energy and raw material are practically unlimited.

BRIEF SUMMARY OF THE INVENTION

This invention relates to an improvement in a solar energy concentrator which cooperates with a conventional boiler and turbine in the conversion of solar heat to mechanical power.

The general object of my invention is to concentrate terrestrially received solar energy on a volatile fluid contained in a boiler, thus heating the fluid and causing it to vaporize, thereby driving a turbine.

A more specific object of my invention is to provide a combination of means for continuously concentrating solar energy on a fixed boiler.

Another specific object of my invention is to provide a carriage imparting to a reflector solar countermotion about a fixed boiler chamber, in combination with a base enabling a single configuration of said carriage to impart said motion to a single configuration of said reflector at any suitable site on the earth, regardless of the latitude of said site.

Still another object of my invention is to improve the operating efficiency of said combination by perfecting the area efficiency and efficiency of motion of said reflector and by improving the thermal efficiency of the combination of said boiler and said turbine.

Further objects of my invention will become apparent from the following, detailed description thereof and from the accompanying drawing.

BRIEF DESCRIPTION OF THE DRAWING

In the accompanying drawing:

FIGS. 1, 2 and 3 show, respectively, side elevation, front elevation and plan views of an embodiment of my invention as it would appear at the equator;

FIGS. 1A, 2A and 3A show, respectively, side elevation, front elevation and plan views of parts of said embodiment in various moved positions, relating respectively to FIGS. 1, 2 and 3; FIGS. 3B and 3C show plan views of part of said embodiment in various, further moved positions, relating to FIG. 3; FIG. 3D shows a plan view of another part of said embodiment; and FIG. 4 shows a side elevation view of an alternative embodiment of part of my invention, whereby the invention is adaptable to locations at latitudes other than the equator.

DETAILED DESCRIPTION OF THE PREFERRED EMBODIMENT

For a fuller understanding of the nature and objects of my invention, reference may be made to the following, detailed description taken in connection with the accompanying drawing. With reference to the details of the drawing, it is stressed that the particulars shown are for explanatory and illustrative purposes only, with the intention of providing a readily understood description of the principles and functions whereby the objects of the invention may be fulfilled. With reference to the description of the embodiment and operation of the invention, it is further stressed that all stated angles and directions are approximate.

In the drawing each part of the invention is numbered, and each part is designated by the same number in each view in which it appears. A lower-case suffix letter is added to the number of each part which is shown in a moved position, consecutive letters being used to denote respectively the successive positions which are shown. Representations of axes of revolutionary motion are shown and numbered. It is stressed that these are not mere center lines, relating views in the drawing, and that they are considered to be essential to an understanding of the llocaions and movements of the various parts and subassemblies of the invention. Representations of typical sunbeams and reflected beams are also shown and numbered. These are not all repeated in every view, the sunbeams being shown only in true projection, and the reflected beams being shown only where they relate to views of parts of the invention in proper position to reflect said sunbeams.

Referring now to FIGS. 1, 2 and 3, an embodiment of my invention is shown as it would appear at the equator at the time of an equinox. It is assumed that north is horizontally to the right in FIG. 1 and vertically upward in FIG. 3. Reference may also be made to FIGS. 1A, 2A, 3A, 3B and 3C, which show a reflector as it would be oriented at the same place but at different times, as will be hereinafter described.

The solar energy concentrator as illustrated includes a boiler, a reflector, a reflector carriage and a reflector base, together with a turbine or other heat engine and associated supporting structures.

The boiler comprises a chamber 1, herewith illustrated as being generally spherical in shape, an inlet pipe 2, extending from the lower part of the chamber in a generally downward and rearward direction, and a discharge pipe 3, extending from the upper part of the chamber in a generally upward and rearward direction, through a supporting structure 4, to the inlet of a turbine or other heat engine 5, hereinafter referred to as a turbine. Turbine supporting structure 4 and a boiler supporting structure 6, to the extremity of which said boiler chamber is directly attached, are preferably cantilevered members of a separate, stationary power plant structure which is independent of all other structures herein specified. Further parts of said power plant structure are omitted from the drawing for the sake of clarity. Boiler chamber 1 has its center on a boiler axis 7, which is perpendicular to the upper surface of a reflector base 8. Said surface is, in the embodiment illustrated, flat and level. Said base being situated at the equator, said upper surface is substantially parallel to the polar axis of the earth.

A fixed axis 9 is perpendicular to boiler axis 7 substantially at the center of boiler chamber 1, extending in a generally north and south direction. Being perpendicular to axis 7, axis 9 is parallel to said upper surface of base 8, and, thus extending, axis 9 lies in the plane of the meridian and is substantially parallel to the polar axis of the earth.

A movable axis 10 is perpendicular to fixed axis 9 at the point of intersection of axes 7 and 9. Axis 10 is rotatable about axis 9 in a plane which is substantially parallel to the equatorial plane of the earth.

The reflector comprises a frame 11 and a reflecting surface 12, said surface having the shape and contour of a paraboloid from which a portion is omitted. For the sake of convenience and clarity of illustration and description said surface is shown in FIGS. 1 and 3 as half of a paraboloid, having one chordal side. As shown in FIG. 3D, said surface preferably comprises a plurality of truncated sectors of said paraboloid, the central extremities of which form part of a regular polygon of suitable size to circumscribe a circle of the diameter of boiler chamber 1, and the outer edges of which form two radial sides of said surface. Said sectors are omitted from FIG. 3 for the sake of clarity.

The reflector is positioned so that in the plan view, as shown in FIGS. 3 and 3D, it is symmetrical about axis 9, so that the focal point of reflecting surface 12 coincides substantially with the center of boiler chamber 1, and so that the radial sides of said surface face toward turbine support member 4, turbine 5 and boiler support member 6. In the mean reflector position shown in FIGS. 1, 2 and 3 the paraboloidal axis of reflecting surface 12, which is not numbered, coincides substantially with boiler axis 7.

The reflector is supported on a plurality of rollers 13, which are attached to frame 11, and it is moved by the carriage, which comprises an oscillating mechanism and a revolving mechanism.

The oscillating mechanism comprises two lower tracks 14, an upper track 15, which in the embodiment shown in a double track, and an oscillation frame 16, rigidly connecting tracks 14 and 15. Each of said tracks is in cross section a channel, having three more or less equal sides, and is in contour an arc of a circle of suitable radius about movable axis 10, subtending an angle of about 47°. Said tracks engage reflector support rollers 13 and constrain them to move about axis 10 in a plurality of circular area, so that said mechanism imparts to the reflector an oscillatory motion about said axis through an arc of about 23°30′ in either direction from the mean position shown in FIG. 1 to one of the extreme positions shown in FIG. 1A, thence to the other extreme position shown in said figure, and thence returning to said mean position. Oscillation frame 16 is supported on a plurality of rollers 17, which are attached to said frame on either side of and symmetrical with respect to the plane described by fixed axis 9 and the paraboloidal axis of reflecting surface 12.

The revolving mechanism comprises a revolve track 18 and a revolve pivot 19. Track 18 is in cross section a channel, having three more or less equal sides, and is in contour an arc of a circle of suitable radius about fixed axis 9. Said track is mounted on a revolve track support 20, in a location which will hereinafter be described. Pivot 19 preferably comprises a conventional arrangement of a shaft fixed to upper oscillation track 15 and an anti-friction bearing, capable of withstanding both radial and axial loads, mounted on a revolve pivot support 21 and centered on axis 9. Track support 20 and pivot support 21 are mounted on a reflector carriage support frame 22, which in turn is fastened to the upper surface of base 8. Suitable structure will be provided, bracing track 18 and pivot support 21 to support frame 22. For the sake of clarity, said bracing structure is omitted from the drawing, and pivot support 21 is shown cut away in FIG. 2. In FIGS. 1 and 3A rollers 13 and 13a are respectively shown as being visible, and in FIGS. 2 and 2A rollers 17 and 17a are respectively shown as being visible, although in these views said rollers are actually hidden.

Track 18 engages rollers 17 and constrains them to move about fixed axis 9 in a plurality of circular arcs, while rotary motion about said axis is provided to track 15 by pivot 19, so that the revolving mechanism imparts to the oscillating mechanism and therewith to the reflector a revolutionary motion about said axis through an arc of about 180° from the position shown in FIG. 2A, through the mean position shown in FIG. 2, to a position 90° upward and to the right of that which is shown in FIG. 2. Axis 10, associated with said oscillating mechanism, thus has imparted to it a rotary motion through the same arc about axis 9.

In the embodiment illustrated oscillation frame support rollers 17 subtend an angle of about 60° in the circular arc about axis 9, as shown in FIG. 2, and track 18 subtends an angle of about 240° in the same arc. These angles may vary, provided that the subtended angle of track 18 be sufficient to allow for the specified revolutionary motion of the reflector and oscillating mechanism.

Suitable motive means will be provided, respectively connecting reflector frame 11 to the oscillating mechanism and oscillation frame 16 to the revolving mechanism, for actuation of the motions herein described. Suitable means will be provided for adjustment of the reflector to any desired starting position, and suitable control means will be provided, to coordinate said motions.

If desired, the reflector and oscillating mechanism may be counterbalanced with weights on arms of suitable length fastened to the outer surfaces of frame 16, outboard of tracks 14. Said counterweights are omitted from the drawing for the sake of clarity.

Sunbeam 23, shown in FIGS. 1 and 1A, typifies those which impinge upon reflecting surface 12 at the summer solstice in the northern hemisphere, representing the northerly extreme of meridian declinations. Sunbeam 24, shown in FIGS. 3 and 3B, typifies those which impinge upon said surface at sunrise on the day of said solstice, representing the extreme northeasterly heading of horizontal sunbeams. In each of these views the beam reflected to the boiler chamber lies in the same plane as the sunbeam, apparently coinciding with it, so no separate number designation is given to either of these reflected beams.

If the paths of extremely angled sunbeams 23 and 24 be taken to pass through the center point of boiler chamber 1, as shown respectively in FIGS. 1 and 3, it will be seen that said sunbeams are two elements in a conical surface which is geometrically generated about fixed axis 9 by the succession of all of the sunbeams the paths of which converge at said point during the time from sunrise to sunset on the day of the summer solstice, that the apex of said conical surface coincides with said point, and that the included angle of said surface is about 133°.

As shown in FIG. 1, turbine 5 is preferably displaced from boiler axis 7 a distance sufficient, and only sufficient, to place it within the envelope of said conical surface. From this it will be seen that turbine support member 4 and boiler support member 6, extending from said power plant structure toward boiler axis 7, with said turbine support member above said boiler support member, with the centerlines of both members lying substantially in the plane of axes 7 and 9, and with said boiler support member terminating at the boiler chamber, are also contained within said envelope, as shown in FIGS. 1 and 3. Also as shown in said figures, revolve track 18 and revolve track support 20 are preferably positioned within said envelope, which will hereinafter be further described.

Referring now to FIG. 4, a side elevation view of an alternative reflector base 25 is shown, said base being constructed in the same manner as base 8, but having its upper surface inclined upward from level ground 26 at an angle 27, which may vary from 0° to 90°. When base 25 is constructed at any suitable site on the earth, angle 27 will be equal to the latitude of said site. It will be seen that when angle 27=0° base 25 and base 8 are identical. When base 25 is situated at a latitude other than 0°, its higher side will face toward the nearer pole of the earth, and said upper surface of said base will therefore lie in a plane substantially parallel to the polar axis of the earth at any latitude.

When carriage support frame 22 and the associated elements of the invention are mounted on base 25 at a latitude other than 0°, the aforementioned power plant structure will preferably be positioned between the nearer pole of the earth and boiler chamber 1. Thus said chamber will overhang the higher side of said base and will be related to it by boiler axis 7.

When the device is situated at the equator, boiler axis 7 will stand substantially at the intersection of the plane of the meridian with the equatorial plane, this being the line to the equatorial zenith, as shown in FIGS. 1 and 2. When the device is mounted on base 25 at any other latitude, axis 7 will stand substantially at the intersection of the plane of the meridian with the plane of that latitude, substantially parallel to the equatorial zenith line at that meridian. Meridian sunbeam 23, FIGS. 1 and 1A, has a declination about 23°30' north of the equatorial zenith; sunbeams parallel to sunbeams 23 will have substantially the same declination with respect to axis 7 at any latitude when the device is so mounted; and thus the latitude vector will be eliminated from the meridian declinations of all sunbeams received by reflecting surface 12 at any latitude.

Fixed axis 9, lying in the plane of the meridian parallel to the upper surface of base 25, will thus remain substantially parallel to the polar axis of the earth at any latitude; movable axis 10, rotating about axis 9 in a plane perpendicular to axis 9, will thus lie in a plane substantially parallel to the equatorial plane of the earth at any latitude; and the orientation of reflecting surface 12 with respect to axis 9 and to the plane of rotary motion of movable axis 10, at any instant during the motions herein specified, will be substantially the same at any latitude.

In the following description it is assumed that the reflector and carriage are mounted on a base 25 and that the device is situated either at the equator or at a north latitude. It is stressed that the various moved positions of reflecting surface 12 described in the following paragraphs are instantaneous positions in a substantially continuous motion whereby said surface follows the sun.

FIGS. 2A and 3A show the sunrise orientation of reflecting surface 12a on the day of an equinox, receiving typical easterly sunbeam 28 and reflecting beam 29 to boiler chamber 1. FIGS. 1, 2 and 3, as previously described, show the device as it would appear at noon on each of said days, typical sunbeams 30 and 31 being reflected to the boiler chamber as indicated respectively by beams 32 and 33. The sunset orientation of the reflecting surface on each of said days, not illustrated, will be 90° upward and to the right, or east, of that shown in FIGS. 2 and 3, opposite to the position shown in FIGS. 2A and 3A, in order to reflect horizontal sunbeams coming from the west. It will be noted that in the moved position shown in FIG. 2A axis 10a coincides substantially with axis 7.

FIG. 3B shows reflecting surface 12b moved to the sunrise position on the day of the summer solstice, receiving sunbeam 24, which is typical of those which impinge upon said surface at said time. As previously noted, the reflected beam, apparently coinciding with said sunbeam, has no separate number designation. FIG. 1A shows reflecting surface 12c in the noon position on said day, reflecting typical sunbeam 23, again in the same plane. FIG. 3B shows the sunet position of reflecting surface 12d on said day, the northwesterly sunbeam, which would be symmetrical with sunbeam 24, being omitted from the drawing.

FIG. 3C shows reflecting surface 12e moved to the sunrise position on the day of the winter solstice, receiving typical sunbeam 34 and reflectinb beam 35 to the boiler chamber. FIG. 1A shows reflecting surface 12f in the noon position on said day, receiving typical sunbeam 36 and reflecting beam 37 to the boiler chamber. FIG. 3C shows the sunset position of reflecting surface 12g on said day, the southwesterly sunbeam also being omitted from the drawing.

The revolving mechanism imparts revolutionary motion to the reflector while said reflector is inclined by the oscillating mechanism, so that in the three positions shown in FIGS. 3B and 1A, on the day of the summer solstice, reflecting surface 12b at sunrise, reflecting surface 12c at noon and reflecting surface 12d at sunset all form nearly the same angle with fixed axis 9. On the day of the winter solstice, FIGS. 3C and 1A, the reflector is inclined at the opposite extreme of its travel but is again revolved at nearly that same angle with axis 9 from sunrise to sunset. In between, on the day of an equinox, FIG. 1, the rim of reflecting surface 12 is parallel to axis 9, and it remains nearly so throughout the revolutionary motion imparted to it during this day.

The previously described envelope contains turbine 5, support members 4 and 6, revolve track 18 and revolve support 20 during the day on which these elements cast their most extensive shadows in the direction of reflecting surface 12. Said elements being contained within said envelope, said shadows clear said surface, and it follows that all less extensive shadows of these elements, on every other day between the vernal and autumnal equinoxes, will also clear said surface. This latter relationship is illustrated in FIGS. 1 and 1A, wherein a sunbeam, passing through the center point of boiler chamber 1 at a declination less northerly than that of sunbeam 23, will clear the lower edge of reflecting surface 12c, showing that a similarly less angled sunbeam, passing support member 4 and turbine 5, will cast no shadow on said surface. Similarly in FIGS. 3 and 3B, a sunbeam passing track 18 from a heading less northerly than that of sunbeam 24, will cast no shadow on reflecting surface 12b.

In FIGS. 1 and 1A it will be seen that sunbeam 36, at the winter solstice, clears the upper extremity of track 15 adjacent to axis 9, from which it follows that sunbeams at declinations less southerly than that of sunbeam 36 will clear said extremity. Similarly, if reflecting surface 12e, FIG. 3C, in the sunrise position on the day of the winter solstice, were to be superimposed on FIG. 3A it would be seen that a sunbeam parallel to sunbeam 34, impinging at the south edge of said surface, would clear the extremity of track 15a adjacent to axis 9, from which it follows that sunbeams coming from headings less southerly than that of said sunbeam will also clear said extremity. Thus the sunbeams impinging on said surface on every day between the autumnal and vernal equinoxes will clear said extremity.

In FIG. 1 it will be seen that revolve pivot support 21, standing on the side of pivot 19 opposite to reflecting surface 12, is well in the clear of sunbeam 36 at the winter solstice. Carriage support frame 22 is below the reflector, and, as specified above, revolve track 18 and track support 20 are located within the conical envelope of summer-solstice sunbeams. Thus no element of the stationary supporting structure of the reflector carriage casts a shadow on reflecting surface 12 at any time of any day of the year.

Other than track 15, which has been accounted for, the motion-imparting elements of the carriage are all disposed either beside or behind the reflecting surface, thus casting no shadow whatsoever on said surface.

Thus reflecting surface 12, formed, supported and moved as herein specified, will remain substantially completely unshaded throughout every day of the year. It has been shown that the relationship of said surface to impinging sunbeams is the same at any latitude and that the relationship of said surface to the other elements of the device is the same at any latitude. Thus the reflecting surface, as herein specified, will remain substantially completely unshaded at any latitude.

If desired, track 18 may be in contour a full circle about fixed axis 9, whereby the reflector and oscillating mechanisms can be nocturnally revolved overhead, thus being returned to the sunrise position. The device may be oriented with pivot 19 toward the nearer pole of the earth, when occurring, provided that the power plant structure, comprising members 4 and 6, be located adjacent to track 18. Pivot 19 and its associated structure may be replaced by the combination of a plurality of rollers riding in an arcuate track, similar to the combination of rollers 17 and track 18, provided that said track be centered on fixed axis 9 and be suitably located in relation to reflecting surface 12. In an alternative embodiment of said surface the arcuate portion of the outline may be replaced by straight sides, or said surface, as it is shown in FIG. 3, may be extended to the line of sunbeam 24 on one side and a like amount on the other side, by the addition of a truncated sector, as in FIG. 3D, to each side, provided that said surface remain substantially paraboloidal in contour. The present specification, setting forth the preferred embodiment of the invention, is intended to be a general description of the elemental form of the invention and is not intended to exclude alternative embodiments, the parts and subassemblies of which coact substantially in accordance with the principles herein set forth.

Two limitations must be noted: In the polar regions, wherein axis 9 is vertical or nearly so, the carriage, being capable of imparting to the reflector a fully circular revolutionary motion, will enable the reflector to follow the sun continuously throughout the 24-hour day, but the supporting structure will shade the reflector for part of each 24-hour period, thus interrupting the reflection of solar energy; and in the winter season in either of said regions the sun does not shine at all, so continuous concentration of solar energy throughout the year is impossible in said regions. These limitations do not exist in the torrid and temperate zones.

The oscillating mechanism imparts to the reflector an annual, oscillatory motion about movable axis 10, said motion being substantially counter to the seasonal variation in the inclination of the earth's polar axis with respect to the sun, thereby causing the reflecting surface to incline generally northward, as shown by reflecting surface 12c in FIG. 1A, when thenorth pole of the earth is inclined toward the sun, and generally southward, as shown by reflecting surface 12f in said figure, when said pole is inclined away from the sun, with substantially no inclination at the time of an equinox, as shown by reflecting surface 12 in FIG. 1. The angular displacement of the reflector between the extreme positions shown in FIG. 1A is about 47°, representing arcuate motion northward from the time of the summer solstice to that of the winter solstice, with a return motion southward during the time to the next summer solstice, for a total travel of about 94° during the full cycle of annual oscillation, which results in an average daily increment of about one quarter of a degree. Said motion is preferably continuous throughout said cycle, although it may be imparted in a series of steps or small increments.

The revolving mechanism imparts to the oscillating mechanism and therewith to the reflector a continuous, diurnal revolutionary motion through a substantially semicircular arc, with a nocturnal return motion, about fixed axis 9, said diurnal motion being substantially counter to the rotation of the earth, thereby causing the reflecting surface to face generally eastward in a horizontal direction at sunrise, generally upward in a direction in the plane of the meridian at noon and generally westward in a horizontal direction at sunset. The daily cycle of this motion is preferably continuous in one direction, although incremental and nocturnally reversed motions may be imparted.

Thus the carriage imparts to the reflector the simultaneous combination of said motions, the resultant of which is a compound motion about a fixed point, said compound motion being substantially counter to the apparent or relative motion of the sun with respect to the earth during the interval between sunrise and sunset on each day of the year, and said point being the substantial coincidence of the intersection of the axes of motion, the focus of the reflector and the center of the boiler chamber. In every operating position to which the carriage moves the reflector the paraboloidal axis of the reflecting surface is aligned with both said point and the sun, with said surface oriented to face the sun. Since all terrestrially received sunbeams are substantially parallel to each other, and since said paraboloidal axis, aligned as specified, is parallel to the sunbeams, it will be seen that the foregoing relationships are illustrated in every drawing figure where said surface is shown in position to reflect one or more sunbeams.

The reflector, thus focused, oriented and aligned, being revolved through a substantially semicircular arc from west to east about the fixed axis by the revolving mechanism, will reflect to the boiler chamber horizontal sunbeams at sunrise, meridian sunbeams at noon and horizontal sunbeams again at sunset, and the oscillating mechanism will incline the reflector northward and southward about the movable axis to reflect to the boiler chamber sunbeams coming from the east or from north or south of east at sunrise, from the equatorial zenith or from north or south of said zenith at noon and from the west or from north or south of west at sunset, substantially within and to the limits which relate to said seasonal changes in the inclination of said polar axis, continuously during the time from sunrise to sunset on every day of the year, at any suitable site in the torrid and temperate zones of the earth, regardless of the latitude of said site, with no substantial change in structure of either the reflector or the carriage as herein set forth, and with no substantial change in the relationship between the reflecting surface and the shadows of the various elements of the carriage and power plant, when said carriage and therewith said reflector are mounted on a base comprising an upper surface which lies in a polar plane as herein specified.

The reflector, so moved, will continuously reflect to and concentrate upon the boiler chamber terrestrially received solar energy, thereby heating said chamber. A suitable fluid, passing into said chamber through the inlet pipe, will be vaporized by heat conducted to it by said chamber and will pass through the discharge pipe to the turbine, thus driving the turbine.

The compound motion imparted to the reflector by the carriage comprises substantially no component or vector to compensate for the curvature of the earth or for the variation in meridian declination of sunbeams which is related to latitude, the latitude vector, as previously noted, being eliminated from said declination when said carriage is mounted on a polar plane base. Said compound motion being substantially limited to solar countermotion about the center point of the boiler chamber at any latitude, the efficiency of the motion thus imparted to said reflector by said carriage in combination with said base is increased substantially to 100% at any latitude, efficiency of motion being the ratio of necessary motion to actually imparted motion, and the motions in this instance being measured in degrees of arcuate travel.

The solar countermotion imparted to the reflector by the carriage, as herein specified, renders feasible the utilization of cantilever support members for the boiler and turbine, and the specified arrangement of said turbine and said members makes it advantageous to omit that portion of the reflecting surface which would be shaded by said turbine and by said members. The utilized portion of said paraboloidal surface being substantially completely unshaded, the area efficiency of said thus formed reflecting surface is increased substantially to 100%, area efficiency being the ratio of effective area to total area.

The specified configuration of reflector, carriage and cantilever support members leads to the arrangement wherein the turbine is located above and in close proximity to the boiler chamber, whereby said vaporized fluid passes from said chamber upward to said turbine with a heat loss which approaches the practical minimum, thereby increasing the thermal efficiency of the combination of boiler and turbine substantially to the maximum which can be expected for this configuration of elements, thermal efficiency being the ratio of power output to heat input, calculated in common units of measurement and expressed as a percentage.

Thus are the objects of my invention fulfilled.

I claim as my invention:

1. An improvement in a solar energy concentrator which includes
    a generally spherical boiler chamber containing a volatile fluid,
    a turbine operatively connected to said boiler chamber,
    a stationary power plant structure including cantilever members which support said chamber and said turbine in respectively fixed positions,
    a reflector including a frame and a reflecting surface which has both a paraboloidal axis and a focal point, said reflector being positioned so that said point coincides substantially with the center point of said chamber, so that said surface is oriented to face the sun and so that said axis is aligned with said center point and the sun when said surface is so oriented, and first and second motive means suitable for imparting motions to said reflector; wherein the improvement comprises:

a base having a variable configuration and comprising an upper surface which forms with level ground an angle substantially equal to the latitude of the site of said base, the higher side of said base, when occurring, being oriented toward the nearer pole of the earth, whereby said upper surface lies in a plane substantially parallel to the polar axis of the earth at any latitude of said site, said base being related to said boiler chamber by a boiler axis which passes through said center point substantially perpendicular to said upper surface, and said base supporting on said upper surface a revolving mechanism comprising an arcuate track and a track support, a pivot and a pivot support, and a first plurality of rollers engaged with said track, said track and said pivot being centered on a fixed axis which lies substantially in the plane of the meridian of said site and passes substantially through said center point substantially perpendicular to said boiler axis, said fixed axis thereby being substantially parallel to said upper surface and to said polar axis at any latitude of said site, said mechanism movably supporting by means of said pivot and said rollers an oscillating mechanism comprising a frame to which said pivot and said rollers are attached, a plurality of arcuate tracks connected to said frame, and a second plurality of rollers engaged with said tracks, said tracks being centered on a movable axis which passes substantially through said center point substantially perpendicular to said fixed axis, said movable axis thus having rotary motion about said fixed axis in a plane which is substantially parallel to the equatorial plane of the earth at any latitude of said site, and said oscillating mechanism movably supporting said reflector by means of said second plurality of rollers, which are attached to said reflector frame, whereby said oscillating mechanism in combination with said first motive means imparts to said reflector an annual oscillatory motion about said movable axis, said motion being substantially counter to the seasonal variation in the inclination of said polar axis with respect to the sun, thereby causing said reflecting surface to incline generally northward when the north pole of the earth is inclined toward the sun and generally southward when said pole is inclined away from the sun, with substantially no inclination at the time of an equinox, while said revolving mechanism in combination with said second motive means imparts to said oscillating mechanism and therewith to said reflector a continuous, diurnal revolutionary motion through a substantially semicircular arc about said fixed axis, said motion being substantially counter to the rotation of the earth, thereby causing said reflecting surface to face generally eastward in a horizontal direction at sunrise, generally upward in a direction in the plane of the meridian at noon and generally westward in a horizontal direction at sunset, the combination of said mechanisms and said first and second motive means thus forming a carriage which, being supported on said upper surface of said base, movably supports said reflector and imparts to it the simultaneous combination of said motions, the resultant of which is a compound motion of said reflecting surface about said center point, said compound motion being substantially counter to the apparent motion of the sun during the interval between sunrise and sunset on each day of the year; and there is thus included a coacting combination of said base and a single configuration of said carriage which causes a single configuration of said reflector to follow the sun at any latitude of said site and thereby to concentrate terrestrially received solar energy on said chamber continuously throughout the time from sunrise to sunset on every day of the year at any suitable site in the torrid and temperature zones of the earth.

2. A device as described in claim 1 wherein:
said compound motion of said reflector is substantially limited to solar countermotion about said center point at any latitude of said site, and there is thus included a combination of means, comprising said base and said carriage, for increasing substantially to 100% the efficiency of motion of said reflector in following the sun at any latitude of said site.

3. A device as in claim 1 wherein:
said boiler chamber is located in relation to said base by means of said boiler axis, said power plant structure is positioned between the nearer pole of the earth, when occurring, and said chamber, said carriage is oriented on said base so that said arcuate track and track support face toward said power plant structure, said cantilever members extend from said structure toward said boiler axis, the member which supports said turbine being above the member which supports said chamber, said turbine and the extremity of said turbine support member are displaced from said boiler axis a distance sufficient to place them within a conical envelope which is geometrically generated about said fixed axis by the succession of sunbeams which, during the day of the summer solstice, follow paths which converge substantially at said center point, said arcuate track and track support are positioned within said conical envelope, said boiler support member extends only to said boiler chamber and is thus located within said envelope, all of the elements contained with said envelope cast their most extensive shadows toward said reflecting surface during the day of the summer solstice, said plurality of arcuate tracks, being disposed either beside or behind said reflector, cast no shadow on said reflecting surface at any time, said pivot support, being positioned on the side of said reflector opposite to said arcuate track and track support, and being attached to said pivot on the side opposite to said reflector, stands in the clear of the sunbeams which impinge on said reflecting surface at the winter solstice, thus casting no shadow on said surface at any time, said reflector and said carriage are supported on said base in such a manner as to remain in constant relationships to said polar axis and to said equatorial plane, whereby all of said shadows fall within the same limits at any latitude of said site, and the orientation of said thus supported reflecting surface in relation to said fixed axis and to said plane of rotary motion of said movable axis, at any instant during said compound motion, is substantially the same at any latitude, whereby the relationship of said surface to said shadows is substantially the same at any latitude of said site, said reflecting surface is substantially in the form of a portion of a paraboloid remaining after omission of a sector which includes an angle not substantially smaller than the included angle of said envelope, said remaining portion thus having two radial sides, said reflector is oriented so that said radial sides of said reflecting surface face toward said power plant structure and so that said surface is symmetrically disposed with respect to said fixed axis, and said reflecting surface thus omits that part of a conventional, fully circular paraboloid which would, during said compound motion, traverse the most extensive shadows of said contained elements at any latitude of said site; and hence there is included a combination comprising said thus supported, thus formed and thus oriented reflecting surface and the arrangement of said thus positioned power plant structure, said thus extending boiler support member, said thus located and thus supported boiler chamber, said thus supported and thus displaced turbine, said thus extending and thus displaced turbine support member, said thus positioned arcuate track and track support, said thus disposed plurality of arcuate tracks and said thus positioned pivot support, coacting with said base and with the remaining elements of said carriage during said compound motion for reflection of impinging sunbeams to said chamber and for concentration of the thus reflected beams substantially at said center point in such a manner that the utilized portion of said paraboloid remains substantially completely unshaded during said concentration of solar energy on said chamber, whereby the area efficiency of said thus supported, thus formed, thus oriented and thus moved reflecting surface is increased substantially to 100% at any suitable site in the torrid and temperate zones of the earth.

4. A device as in claim 1 wherein:

said boiler chamber is located in relation to said base by means of said boiler axis, said power plant structure is positioned between the nearer pole of the earth, when occurring, and said boiler chamber, said carriage is oriented on said base so that said arcuate track and track support face toward said power plant structure, said cantilever members extend from said structure toward said boiler axis, the member which supports said turbine being above the member which supports said chamber, said turbine is displaced from said boiler axis a distance only sufficient to place it within a conical envelope which is geometrically generated about said fixed axis by the succession of sunbeams which, during the day of the summer solstice, follow paths which converge substantially at said center point, said turbine thus being located in a position above and in close proximity to said chamber; and hence there is included a combination comprising said thus located and thus supported boiler chamber and the arrangement of said thus positioned power plant structure, said thus extending cantilever members and said thus supported, thus displaced and thus located turbine, coacting with said combination of base and carriage and with said thus supported and thus moved reflector during said compound motion for said concentration of said solar energy on said chamber, for heating said fluid and causing it to vaporize, for passage of the thus vaporized fluid to said turbine and for driving the turbine in such a manner that said thus vaporized fluid is enabled to pass from said chamber upward to said turbine with a minimum heat loss, whereby the thermal efficiency of the combination of said thus located and thus supported boiler chamber and said thus supported, thus displaced and thus located turbine during said passage of said fluid is increased substantially to the maximum consistent with the configuration of this class of device.

* * * * *